US008112197B2

(12) United States Patent
Amagasa et al.

(10) Patent No.: US 8,112,197 B2
(45) Date of Patent: Feb. 7, 2012

(54) WIPER APPARATUS CONTROL METHOD AND WIPER CONTROL SYSTEM

(75) Inventors: Toshiyuki Amagasa, Kiryu (JP);
Takashi Kondo, Wako (JP); Toru Namiki, Wako (JP)

(73) Assignees: Mitsuba Corporation, Gunma (JP);
Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 12/292,079

(22) Filed: Nov. 12, 2008

(65) Prior Publication Data

US 2009/0125183 A1    May 14, 2009

(30) Foreign Application Priority Data

Nov. 13, 2007 (JP) ................................. 2007-294784

(51) Int. Cl.
*A47L 1/02* (2006.01)
*B60S 1/08* (2006.01)
*B60S 1/16* (2006.01)
*B60S 1/28* (2006.01)

(52) U.S. Cl. ...... 701/36; 701/29; 15/250.12; 15/250.14; 318/443; 318/444

(58) Field of Classification Search .............. 701/36, 701/49, 29; 15/250.12, 250.13, 250.14; 318/483, 318/443, 444; 307/9.1
See application file for complete search history.

(56) References Cited

U.S. PATENT DOCUMENTS

| | | | | | |
|---|---|---|---|---|---|
| 4,881,019 | A | * | 11/1989 | Shiraishi et al. | 318/68 |
| 4,999,550 | A | * | 3/1991 | Jones | 318/50 |
| 6,107,766 | A | * | 8/2000 | Amagasa | 318/443 |
| 7,256,565 | B2 | * | 8/2007 | Merkel et al. | 318/443 |
| 7,895,701 | B2 | * | 3/2011 | Amagasa et al. | 15/250.13 |
| 2006/0006826 | A1 | * | 1/2006 | Morishita | 318/483 |
| 2006/0261768 | A1 | * | 11/2006 | Kawada et al. | 318/443 |
| 2006/0272118 | A1 | * | 12/2006 | Kawada et al. | 15/250.13 |
| 2009/0119866 | A1 | * | 5/2009 | Amagasa et al. | 15/250.31 |
| 2009/0125183 | A1 | * | 5/2009 | Amagasa et al. | 701/36 |
| 2009/0206659 | A1 | * | 8/2009 | Sakamoto | 307/9.1 |
| 2010/0101040 | A1 | * | 4/2010 | Debrouwere | 15/250.12 |

FOREIGN PATENT DOCUMENTS

| | | | |
|---|---|---|---|
| EP | 1447288 | * | 8/2004 |
| JP | 11-301417 | | 11/1999 |
| JP | 11-321569 | | 11/1999 |

OTHER PUBLICATIONS

JP11-321569 Translation claims.*
JP11-321569 Translation Detailed Description.*
EP 1447288 Translation Abstract.*

* cited by examiner

*Primary Examiner* — Toan C To
*Assistant Examiner* — Karen A Beck
(74) *Attorney, Agent, or Firm* — Wenderoth, Lind & Ponack, L.L.P.

(57) ABSTRACT

A wiper apparatus includes: a wiper blade driven by a first motor; and a wiper blade driven by a second motor. The motors are drive-controlled by control microcomputers, respectively. The control microcomputers are connected to each other through a communication line. While exchanging position information of the wiper blades through the communication line, the control microcomputers synchronously drive the motors on the basis of a position relationship between both of the wiper blades. When an abnormality occurs in a communication state of an in-vehicle LAN, a setting state of a wiper switch is grasped through a switch signal line directly connected to the wiper switch, and wipers are prevented from being stopped when such communication abnormality occurs.

2 Claims, 3 Drawing Sheets

WIPER APPARATUS CONTROL METHOD AND WIPER CONTROL SYSTEM

BACKGROUND OF THE INVENTION

1. Field of the Invention

The present invention relates to a control technology for a vehicle wiper apparatus, and more particularly, to a control technology when a communication abnormality between motors occurs in an opposite-wiping type wiper apparatus.

2. Description of the Related Art

In recent years, in a vehicle wiper apparatus of an automobile or the like, in particular, in an opposite-wiping type (opposite type) wiper apparatus, a mode has been adopted as disclosed in Japanese Patent Application Laid-open No. Hei 11-301409, in which respective wiper arms on a driver's seat side and a passenger's seat side are individually driven by motors. In such a wiper apparatus as described above, in order that left and right wiper blades (hereinafter, abbreviated as blades as appropriate) cannot interfere with each other on a wiped surface, the motors are individually controlled while confirming position angles of the respective blades. For example, in the apparatus of the above-mentioned publication, the position angles of the left and right blades are always monitored by a wiper control system. A target angle difference is previously set between both of the blades, and while the position angles of the blades are being mutually referred to, speeds of the left and right motors are individually controlled so that a difference between the target angle difference and an actually measured angle difference can become small.

FIG. 3 is an explanatory view illustrating a system configuration of the wiper apparatus as described above. A wiper apparatus 51 of FIG. 3 has a so-called opposite-wiping type configuration in which wiper blades on the driver's seat side and the passenger's seat side are arranged opposite to each other. A blade 52a on the driver's seat side (hereinafter, abbreviated as DR side) and a blade 52b on the passenger's seat side (hereinafter, abbreviated as AS side) perform wiping operations in an opposite manner to each other between upper turning positions set on both end sides of a windshield and lower turning positions set on lower-end center portions of the windshield. A DR-side motor 53a and an AS-side motor 53b are separately provided on the DR side and the AS side, respectively.

The motors 53a and 53b are housed in motor units 54a and 54b, respectively. In the units 54a and 54b, sensors are provided, which output relative position signals (rotation signals) proportional to motor rotation angles and indicating blade movement amounts, and output absolute position signals indicating blade positions. In the units 54a and 54b, control microcomputers 55a and 55b are further provided. The microcomputers 55a and 55b calculate position information (current positions) of the blades 52a and 52b on the basis of the signals output by the sensors in the units. Each of the microcomputers 55a and 55b counts the number of pulses of the relative position signal after the absolute position signal is obtained, whereby the microcomputers 55a and 55b recognize the current positions of the blades 52a and 52b.

The unit 54a on the DR side is connected to an ECU 56 serving as a control device on a vehicle body side. Switch information such as ON/OFF of a wiper switch and LO, HI, and INT thereof are input from the ECU 56 to the unit 54a through an in-vehicle LAN 58. The units 54a and 54b are connected to each other by a communication line 57. Through an intermediation of the communication line 57, the microcomputers 55a and 55b of both of the units 54a and 54b exchange the information regarding the blade positions with each other. The microcomputers 55a and 55b control the motors 53a and 53b to rotate positively and reversely at the upper and lower turning positions, and thereby allow the blades 52a and 52b to perform the reciprocative wiping operations. Further, on the basis of the mutual blade position information of the blades 52a and 52b, the microcomputers 55a and 55b control the motors 53a and 53b to operate synchronously so that both of the blades 52a and 52b cannot interfere with each other and so that the angle difference cannot be increased.

However, in the wiper apparatus that operates upon receiving the switch information from the in-vehicle LAN in such a manner as described above, there has been a problem that it becomes impossible to drive the wiper apparatus when the communication abnormality occurs in the LAN system. In particular, when the communication abnormality occurs during the operation of the wiper apparatus, the wiper blades are suddenly stopped during the operation thereof. Therefore, there has been an apprehension that the wipers may be stopped in a state which a user cannot predict, and measures against this situation have been required.

SUMMARY OF THE INVENTION

An object of the present invention is directed to maintain the operation of the wiper apparatus and to ensure a view of a driver even in the case where the communication abnormality occurs in the in-vehicle LAN system.

The present invention provides a control method for a vehicle wiper apparatus including a first motor that is drive-controlled by a first control circuit, a first wiper blade that is driven by the first motor, a second motor that is drive-controlled by a second control circuit connected to the first control circuit through an intermediation of a communication line, and a second wiper blade that is driven by the second motor. An operation control for the first wiper blade and the second wiper blade is performed in accordance with a setting state of a wiper switch, in which the first control circuit is connected to a vehicle information communication line that transmits control information from a vehicle side, the control information including the setting state of the wiper switch, and to a switch signal line directly connected to the wiper switch. The first control circuit acquires the setting state of the wiper switch through the vehicle information communication line when a communication state of the vehicle information communication line is normal, acquires the setting state of the wiper switch through the switch signal line when abnormality occurs in the communication state of the vehicle information communication line, and drive-controls the first motor and the second motor by the first control circuit and the second control circuit.

According to the control method for a wiper apparatus of the present invention, in the case where the communication abnormality occurs in the vehicle information communication line, an acquisition route for the setting state of the wiper switch is changed, and the setting state of the wiper switch is grasped through the switch signal line directly connected to the wiper switch, and accordingly, the state of the wiper switch can be confirmed even when communication abnormality occurs. Therefore, the wiper apparatus does not become incapable of driving due to the abnormality of the vehicle information communication line as in the conventional wiper apparatus, whereby it becomes possible to maintain the wiping operation of the wiper apparatus even when the communication abnormality occurs. Hence, the view of the driver at the time when the communication abnormality occurs can be ensured, whereby it becomes possible to enhance safety.

The present invention provides a control system for a vehicle wiper apparatus including a first wiper blade that is driven by a first motor, and a second wiper blade that is driven by a second motor, in which an operation control for the first wiper blade and the second wiper blade is performed in accordance with a setting state of a wiper switch. The control system for the vehicle wiper apparatus includes: a vehicle information communication line that transmits control information from a vehicle side, the control information including the setting state of the wiper switch; a switch signal line directly connected to the wiper switch; a first control circuit that is connected to the vehicle information communication line and the switch signal line, and performs a drive control for the first motor; and a second control circuit that is connected to the first control circuit through a communication line, and performs a drive control for the second motor, in which the first control circuit acquires the setting state of the wiper switch through the vehicle information communication line when a communication state of the vehicle information communication line is normal, acquires the setting state of the wiper switch through the switch signal line when abnormality occurs in the communication state of the vehicle information communication line, and drive-controls the first motor and the second motor by the first control circuit and the second control circuit.

According to the control system for a wiper apparatus according to the present invention, there is provided the control circuit that, in the case where the communication abnormality occurs in the vehicle information communication line, changes the acquisition route for the setting state of the wiper switch, and grasps the setting state of the wiper switch through the switch signal line directly connected to the wiper switch. Accordingly, the control system can confirm the state of the wiper switch even when the communication abnormality occurs. Therefore, the wiper apparatus does not become incapable of driving due to the abnormality of the vehicle information communication line as in the conventional wiper apparatus, whereby it becomes possible to maintain the wiping operation of the wiper apparatus even when the communication abnormality occurs. Hence, the view of the driver at the time when the communication abnormality occurs can be ensured, whereby it becomes possible to enhance the safety.

In the control system for a vehicle wiper apparatus, the first control circuit may be provided with: a switch signal input unit that is connected to the switch signal line, and receives the setting state of the wiper switch through the switch signal line; a communication state detection unit that detects the communication state of the vehicle information communication line; and a switch information input switching unit that switches a route for acquiring the setting state of the wiper switch from the vehicle information communication line to the switch signal line.

DESCRIPTION OF THE PREFERRED EMBODIMENT

Figure 1:
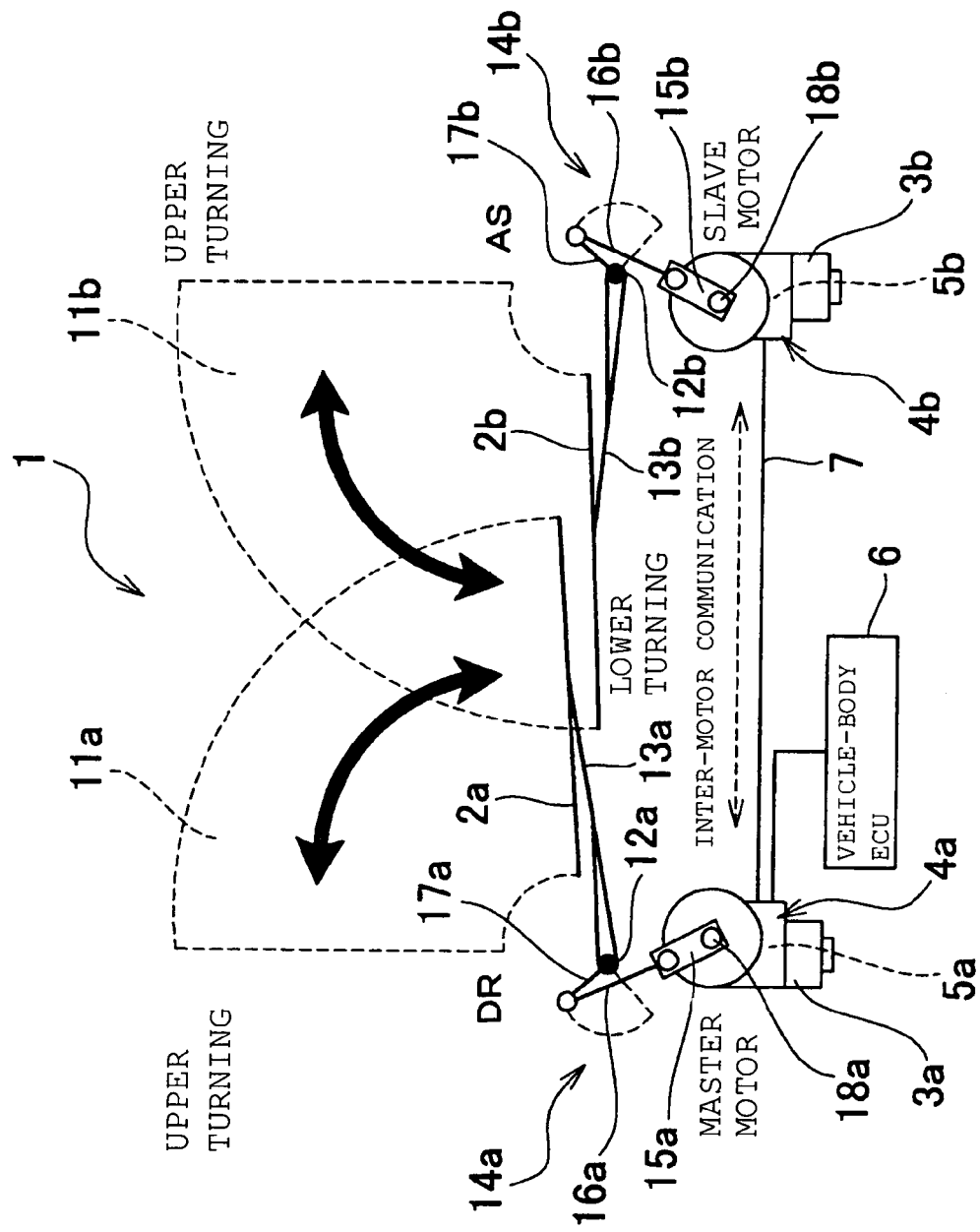
FIG. 1 is an explanatory view illustrating an entire configuration of a wiper apparatus which is driven by a control method and a control system according to an embodiment of the present invention.

A description is made below in detail of an embodiment of the present invention with reference to the drawings. FIG. 1 is an explanatory view illustrating an entire configuration of a wiper apparatus which is driven by a control method and a control system according to the embodiment of the present invention. A wiper apparatus 1 of FIG. 1 is a so-called opposite-wiping type wiper apparatus in which a wiper blade 2a (first wiper blade) of a diver's seat side (hereinafter, abbreviated as DR side) and a wiper blade 2b (second wiper blade) of a passenger's seat side (hereinafter, abbreviated as AS side) are arranged opposite to each other. On the DR side and the AS side, a DR-side motor (first motor) 3a and an AS-side motor (second motor) 3b are separately provided, respectively. Hereinafter, the DR-side motor 3a and the AS-side motor 3b are abbreviated as motors 3a and 3b, respectively. The blades 2a and 2b are driven by the motors 3a and 3b, respectively, and perform wiping operations in an opposite manner to each other between upper turning positions set on both end sides of a windshield and lower turning positions set on lower-end center portions of the windshield. Note that suffixes "a, b" in the reference symbols represent that members and portions denoted thereby are members and portions which are related to the DR side and the AS side, respectively.

Blade rubber members (not shown) are attached onto the blades 2a and 2b. The rubber members are moved on a vehicle windshield while being brought into intimate contact therewith, whereby water droplets and the like, which are present on wiped areas 11a and 11b illustrated by broken lines of FIG. 1, are wiped off. The blades 2a and 2b are supported on wiper arms 13a and 13b fixed to tip ends of wiper shafts 12a and 12b. The blades 2a and 2b perform swing motions in left and right directions by drive systems 14a and 14b using the motors 3a and 3b as drive sources. The drive systems 14a and 14b include link mechanisms including: the motors 3a and 3b; crank arms 15a and 15b; coupling rods 16a and 16b; drive levers 17a and 17b; and the wiper arms 13a and 13b.

The drive levers 17a and 17b are further attached onto the wiper shafts 12a and 12b to which the wiper arms 13a and 13b are fixed. The coupling rods 16a and 16b are attached onto end portions of the drive levers 17a and 17b. Other end sides of the coupling rods 16a and 16b are connected to tip end portions of the crank arms 15a and 15b fixed to output shafts 18a and 18b of the of the motors 3a and 3b. When the motors 3a and 3b are driven, and the output shafts 18a and 18b rotate, the crank arms 15a and 15b rotate. Those motions are transmitted to the drive levers 17a and 17b through an intermediation of the coupling rods 16a and 16b. In this way, rotation motions of the motors 3a and 3b are converted into swing motions of the wiper arms 13a and 13b, and the blades 2a and 2b move reciprocatively between the upper and lower turning positions.

The motors 3a and 3b are housed in motor units 4a and 4b. In the units 4a and 4b, sensors (not shown) are provided, which output relative position signals (motor pulses) proportional to motor rotation angles and indicating blade movement amounts, and output absolute position signals indicating specific blade positions. In the motor units 4a and 4b, there are further provided a control microcomputer 5a (first control circuit) and a control microcomputer 5b (second control circuit), which calculate position information of the blades 2a and 2b on the basis of on the signals output by the sensors. The unit 4a on the DR side is connected through an intermediation of an in-vehicle LAN 8 (vehicle information communication line) to an ECU 6 serving as a control device on a vehicle body side. Switch information such as ON/OFF of a wiper switch and LO, HI, and INT (intermittent operation) thereof, vehicle speed information, and the like are input from the ECU 6 with respect to the unit 4a. The units 4a and 4b are connected to each other by a communication line 7. The motor 3a connected to the ECU 6 serves as one on a master side, the motor 3b connected to the motor 3a by the communication line 7 serves as one on a slave side, and in this state, both of the motors 3a and 3b are controlled.

The control microcomputers 5a and 5b of both of the units 4a and 4b mutually acquire counterpart blade position information through the communication line 7. Here, each of the relative position signals as described above is a pulse signal generated in accordance with the rotation of the motor, and the number of pulses, which is proportional to the motor rotation angle, is output. Meanwhile, the absolute position signals are one-shot signals output when the blades 2a and 2b come to the lower turning positions. The number of revolutions of each of the motors 3a and 3b and the number of revolutions of each of the output shafts 18a and 18b are in a constant relationship that is based on a reduction ratio. Hence, a rotation angle of each of the output shafts 18a and 18b can be calculated on the basis of the number of pulses. Meanwhile, the rotation angle of each of the output shafts 18a and 18b and a movement angle of each of the blades 2a and 2b have a constant correlation that is based on the link mechanism of each of the drive systems 14a and 14b. Hence, the number of pulses of each of the relative position signals is summed up, whereby the movement angle of each of the blades 2a and 2b can be confirmed.

In this connection, each of the microcomputers 5a and 5b detects a current position of each of the blades 2a and 2b on the basis of a combination of the absolute position signal indicating the lower turning position and of the number of pulses. While exchanging such pieces of the position information through the communication line 7, the microcomputers 5a and 5b synchronously control the motors 3a and 3b on the basis of a position relationship between both of the blades. Specifically, the microcomputers 5a and 5b first control the motors 3a and 3b to rotate positively and reversely based on the positions of the blades on their own side. In such a way, the blades 2a and 2b perform reciprocative wiping operations between the upper and lower turning positions. At the same time, the microcomputers 5a and 5b control the motors 3a and 3b on the basis of the blade position information of both of the blades 2a and 2b, and thereby control the wiper apparatus 1 so that the blades cannot interfere with each other and such that an angle difference cannot be increased therebetween.

Figure 2:
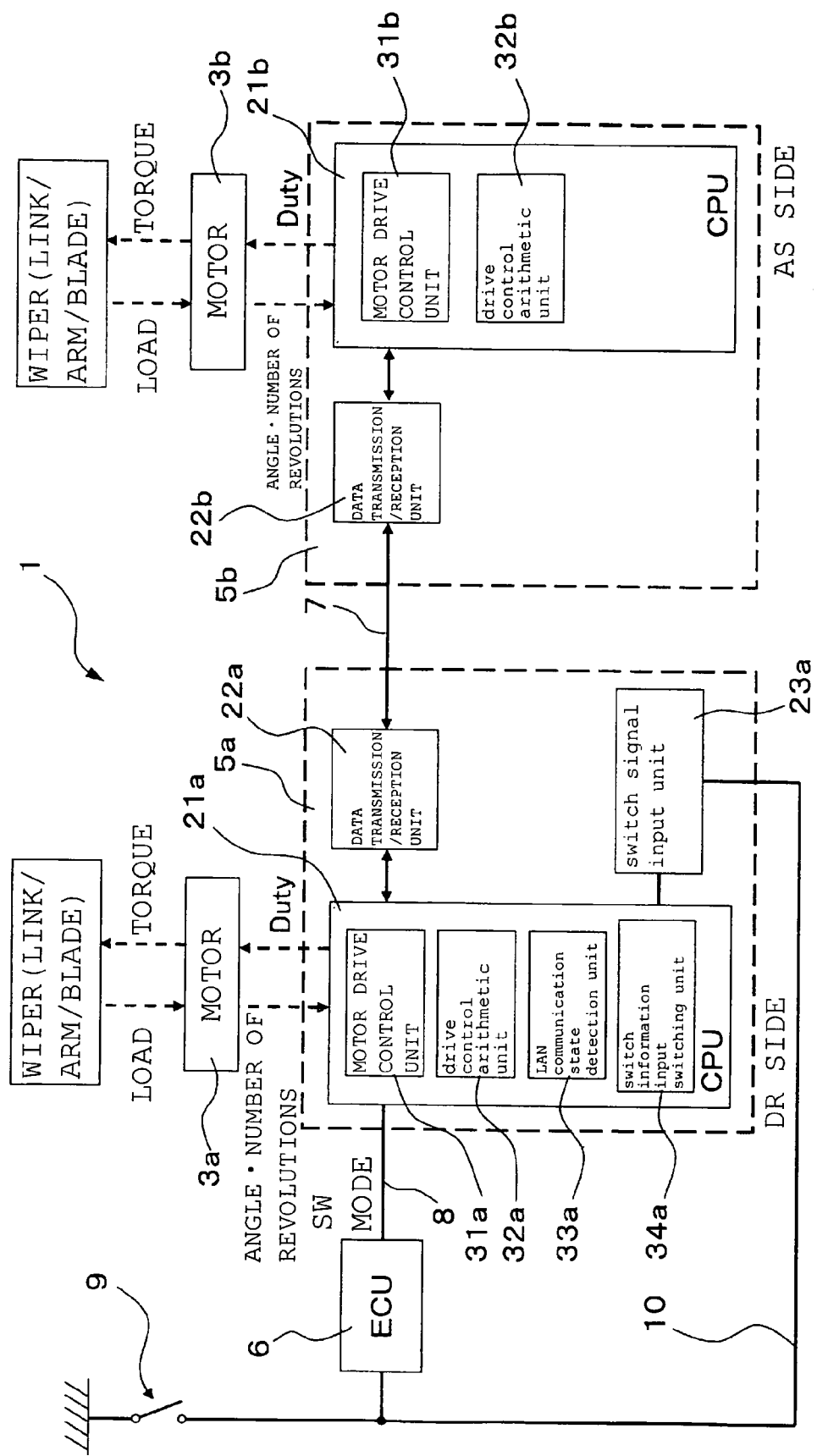
FIG. 2 is a block diagram illustrating a configuration of a control system of the wiper apparatus of FIG. 1.
Figure 3:
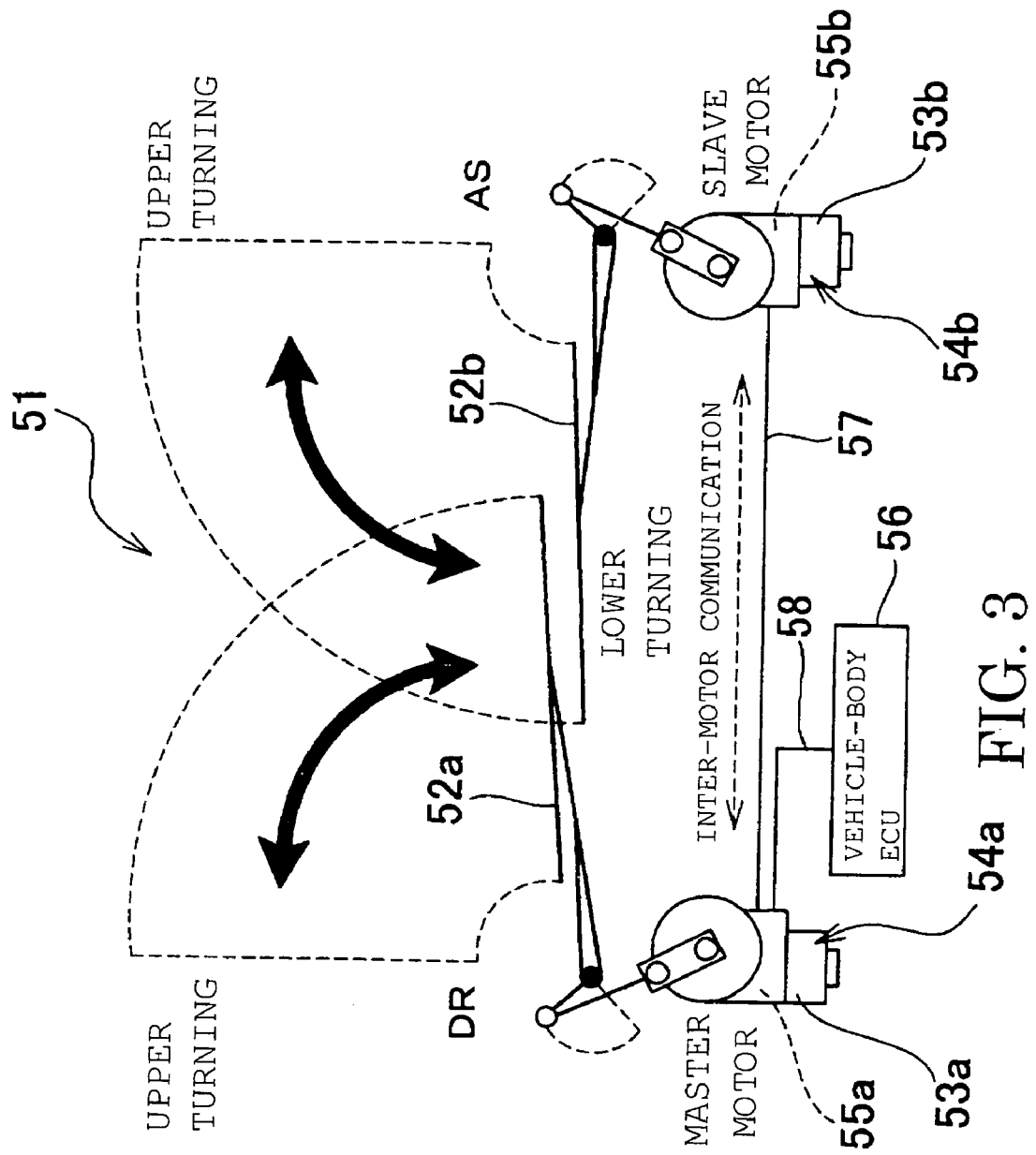
FIG. 3 is an explanatory view illustrating a system configuration of an opposite-wiping type wiper apparatus.

FIG. 2 is a block diagram showing a configuration of a control system of the wiper apparatus 1. In the control microcomputers 5a and 5b, CPUs 21a and 21b and data transmission/reception units 22a and 22b are provided. The control microcomputer 5a is connected to the ECU 6 through the intermediation of the in-vehicle LAN 8, and receives, from the ECU 6, wiper switch information indicating a setting state (ON/OFF, and operation mode setting such as Lo, Hi and INT) of the wiper switch 9. Moreover, in the control microcomputer 5a, a switch signal input unit 23a is provided, to which a switch signal of the wiper switch 9 is directly input. The switch signal input unit 23a is connected to the wiper switch 9 through the intermediation of a switch signal line 10 (hereinafter, abbreviated as a signal line 10). The switch signal (wiper switch information) indicating ON/OFF of the wiper switch 9 is directly input to the switch signal input unit 23a without passing through the in-vehicle LAN 8.

The CPUs 21a and 21b are central processing units. Herein, the CPU 21a connected to the ECU 6 serves as one on the master side, and the CPU 21b serves as one on the slave side. The CPUs 21a and 21b are connected to the communication line 7 through the intermediation of the data transmission/reception units 22a and 22b, and mutually transfer pieces of the position information and operation instructions therethrough. In accordance with the state of the wiper switch 9, the CPU 21a on the master side controls the operation of the motor 3a on the basis of the position information of the blade 2b from the control microcomputer 5b and on the position information of its own (that is, of the blade 2a). In accordance with an instruction from the control microcomputer 5a, the CPU 21b on the slave side controls the operation of the motor 3b on the basis of the position information of the blade 2a from the control microcomputer 5a and on the position information of its own (that is, of the blade 2b).

In the CPUs 21a and 21b, there are individually provided motor drive control units 31a and 31b and drive control arithmetic units 32a and 32b. The drive control arithmetic units 32a and 32b detect the relative position signals, the absolute position signals and the like from the motors 3a and 3b. Then, the arithmetic units 32a and 32b arithmetically operate a control mode of the motors 3a and 3b on the basis of the current blade position, the position relationship between both of the blades, the motor speeds, loads, the wiper switch information and the like. The motor drive control units 31a and 31b instruct the motors 3a and 3b on rotation directions, duties and the like on the basis of results of such arithmetic operations of the drive control arithmetic units 32a and 32b, and appropriately operate the blades 2a and 2b between the upper and lower reversing positions.

Meanwhile, in the CPU 21a, a LAN communication state detection unit 33a that detects a communication state of the in-vehicle LAN 8 is further provided. The LAN communication state detection unit 33a always monitors the communication state of the in-vehicle LAN 8, and checks whether or not the communication is stopped and an abnormal signal is input thereto. Moreover, in the CPU 21a, a switch information input switching unit 34a is provided, which switches an acquisition route for the wiper switch information when a communication abnormality occurs in the in-vehicle LAN 8. When the communication abnormality in the in-vehicle LAN 8 is sensed by the LAN communication state detection unit 33a, the switch information input switching unit 34a switches an input channel of the wiper switch information from the channel via the in-vehicle LAN 8 to the channel via the signal line 10. Specifically, in the case where the communication abnormality occurs in the in-vehicle LAN 8, the CPU 21a directly captures the switch signal of the wiper switch 9 through the intermediation of the signal line 10.

In the wiper apparatus 1 having the configuration as described above, such processing as follows is performed in the case where the communication abnormality occurs in the in-vehicle LAN 8. As described above, the communication state of the in-vehicle LAN 8 is always monitored by the LAN communication state detection unit 33a of the control microcomputer 5a. In the case where the communication of the in-vehicle LAN 8 is performed normally, the CPU 21a executes a usual synchronous control between the DR side and the AS side by such an inter-motor communication by using the wiper switch information acquired through the in-vehicle LAN 8. In this case, the wiper switch information (that is, the switch signal of the wiper switch 9) obtained from the signal line 10 is not used.

As opposed to this, in the case where an abnormality is present in the communication state of the in-vehicle LAN 8, in the case, for example, where the communication is completely stopped due to a break of the in-vehicle LAN 8 or abnormal data is transmitted therethrough, communication abnormality processing is executed. This communication abnormality processing is executed by the switch information input switching unit 34*a*, and the input channel of the wiper switch information is switched from the channel via in-vehicle LAN 8 to the channel via the signal line 10. Specifically, when the LAN communication state detection unit 33*a* senses the abnormality occurrence of the in-vehicle LAN 8, the switch information input switching unit 34*a* directly acquires the switch signal via the signal line 10. Then, the drive control arithmetic units 32*a* and 32*b* discontinue to use the wiper switch information via the in-vehicle LAN 8, and instead the wiper switch information directly acquired from the signal line 10 for the drive control of the wiper apparatus 1.

In this case, with regard to an emergency escape, it is sufficient if the ON/OFF state (regardless of operating state) of the wiper switch 9 can be at least obtained. Therefore, in this control concerned, when the communication abnormality occurs, only ON/OFF of the wiper switch 9 is obtained from the switch signal, and the wiper control is executed while restricting functions of the wiper apparatus. Specifically, in the case where the communication abnormality is sensed, and ON of the wiper switch 9 is confirmed by the switch signal via the signal line 10, only an operation (for example, Lo wiping) of a fixed state is executed regardless of the state of the wiper switch 9. In such a way, even if the communication abnormality occurs in the in-vehicle LAN 8, the minimum wiping function is ensured.

As described above, in the control processing according to the present invention, in the case where the communication abnormality occurs in the in-vehicle LAN 8, the acquisition route for the wiper switch information is changed, and the setting state of the wiper switch 9 is grasped though the signal line 10 directly connected to the wiper switch 9. Therefore, even at the time when an abnormality occurs in the in-vehicle LAN, the control microcomputer 5*a* can obtain the state of the wiper switch 9, and the wiper apparatus does not become incapable of driving due to the abnormality of the in-vehicle LAN 8 as in the conventional wiper apparatus. Specifically, even at the time when the abnormality occurs in the in-vehicle LAN, it becomes possible for the wiper apparatus 1 to perform the wiping operation, whereby it becomes possible to ensure the view of the driver.

In particular, in the control processing according to the present invention, even in the case where the communication abnormality occurs during the wiper operation, the input channel is switched from the channel via the in-vehicle LAN 8 to the channel via the switch signal line 10 by the switch information input switching unit 34*a*. Therefore, the wiper blades are not suddenly stopped during the operation thereof, and the motors 3*a* and 3*b* are driven while confirming the switch state sent from the switch signal line 10. In this case, the mutual motor information is transferred through the communication line 7 connected between the motors 3*a* and 3*b*, and the wiping control for the wiper apparatus is continued by using this information. Hence, even in this case, the control for the wiper apparatus is executed in a similar way to the time before the communication abnormality occurs, and the wiper blades do not interfere with each other. Specifically, in the control processing according to the present invention, not only the stop of the wipers in a state which a user cannot predict can be avoided, but also the normal operation of the wiper apparatus is ensured, whereby safety can also be enhanced.

The present invention is not limited to the above-mentioned embodiment, and it is needless to say that a variety of alterations are possible within the scope without departing from the gist of the present invention.

For example, in the above-mentioned embodiment, in the case where the communication abnormality occurs in the in-vehicle LAN 8, the input channel of the wiper switch information is switched, and only a predetermined operation (Lo wiping in the above-mentioned example) is allowed to be executed. However, the operation at the time when the communication abnormality occurs is not limited to the above-mentioned Lo wiping, and Hi wiping and INT wiping may be applied. Further, the switch signal via the signal line 10 may be allowed to contain operation mode setting of the wiper switch 9, and the wiper apparatus 1 may be allowed to execute an operation that accords with such a setting state of the wiper switch 9 even when the communication abnormality occurs. Still further, when the communication abnormality occurs, the driver may be notified of such an occurrence of the abnormality by means of a warning lamp, a voice notice, a buzzer, display on a monitor, and the like.

What is claimed is:

1. A control method for a vehicle wiper apparatus comprising a first motor that is drive-controlled by a first control circuit, a first wiper blade that is driven by the first motor, a second motor that is drive-controlled by a second control circuit connected to the first control circuit through an intermediation of a communication line, and a second wiper blade that is driven by the second motor, wherein, said method comprises:

adjusting an operation control for the first wiper blade and the second wiper blade in accordance with a setting state of a wiper switch;

wherein the first control circuit is connected to a vehicle information communication line that transmits control information from a vehicle-side control unit, the control information including the setting state of the wiper switch, and the first control circuit is connected to a switch signal line directly connected to the wiper switch;

detecting a communication state of the vehicle information communication line using a communication state detection unit of the first control circuit;

using the first control circuit to acquire the setting state of the wiper switch through the vehicle information communication line when the communication state detection unit determines that the communication state of the vehicle information communication line is normal;

using a switch information input switching unit of the first control circuit to switch a route for acquiring the setting state of the wiper switch from the vehicle information communication line to the switch signal line and obtaining an ON/OFF setting of the wiper switch regardless of a wiper operating mode through the switch signal line when the communication state detection unit determines that the communication state of the vehicle information communication line is abnormal; and synchronously drive controlling the first motor and the second motor in a fixed state regardless of the wiper operating mode by using the first control circuit and the second control circuit, respectively, when the ON setting of the wiper switch in confirmed and when the communication state of the vehicle information communication line is abnormal.

2. A control system for a vehicle wiper apparatus comprising a first wiper blade that is driven by a first motor, and a second wiper blade that is driven by a second motor, in which an operation control for the first wiper blade and the second wiper blade is performed in accordance with a setting state of a wiper switch, the control system for the vehicle wiper apparatus comprising:
- a vehicle information communication line that transmits control information from a vehicle-side control unit, the control information including the setting state of the wiper switch;
- a switch signal line directly connected to the wiper switch;
- a first control circuit that is connected to the vehicle information communication line and to the switch signal line, and is configured to perform a drive control for the first motor, the first control circuit including a communication state detection unit for detecting a communication state of the vehicle information communication line, and including a switch information input switching unit; and
- a second control circuit that is connected to the first control circuit through a communication line, and is configured to perform a drive control for the second motor,
- wherein the first control circuit is configured to acquire the setting state of the wiper switch through the vehicle information communication line when the communication state detection unit determines that the communication state of the vehicle information communication line is normal,
- wherein the first control circuit is configured to switch a route for acquiring the setting state of the wiper switch from the vehicle information communication line to the switch signal line using the switch information input switching unit and to obtain an ON/OFF setting of the wiper switch regardless of a wiper operating mode through the switch signal line when the communication state detection unit determines that the communication state of the vehicle information communication line is abnormal, and
- wherein the first control circuit and the second control circuit are configured to synchronously drive-control the first motor and the second motor, respectively, in a fixed state regardless of the wiper operating mode when the ON setting of the wiper switch is confirmed and when the communication state of the vehicle information communication line is abnormal.

* * * * *